(12) United States Patent
Tabei et al.

(10) Patent No.: US 7,291,691 B2
(45) Date of Patent: *Nov. 6, 2007

(54) CURABLE SILICONE RESIN COMPOSITION

(75) Inventors: Eiichi Tabei, Annaka (JP); Akira Yamamoto, Jyoetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 10/917,280

(22) Filed: Aug. 13, 2004

(65) Prior Publication Data

US 2005/0038221 A1 Feb. 17, 2005

(30) Foreign Application Priority Data

Aug. 14, 2003 (JP) .............................. 2003-293524

(51) Int. Cl.
*C08G 77/12* (2006.01)
(52) U.S. Cl. ........................... 528/25; 528/31; 528/37; 528/32
(58) Field of Classification Search ............... 528/31, 528/25, 37, 32
See application file for complete search history.

(56) References Cited

U.S. PATENT DOCUMENTS 4,902,731 A * 2/1990 Leibfried .................... 528/15
5,008,360 A * 4/1991 Bard et al. .................. 528/25
5,171,817 A 12/1992 Barnum et al.
5,196,498 A * 3/1993 Leibfried, Sr. .............. 528/15

FOREIGN PATENT DOCUMENTS

| DE | 692 15 950 T2 | 4/1997 |
|---|---|---|
| DE | 698 15 073 T2 | 4/2004 |
| JP | 10-228249 | 8/1998 |
| JP | 10-242513 | 9/1998 |
| JP | 2000-123981 | 4/2000 |
| JP | 2002-324920 | 11/2002 |
| JP | 2002-327114 | 11/2002 |
| JP | 2002-327126 | 11/2002 |
| JP | 2002-338833 | 11/2002 |
| JP | 2002-341101 | 11/2002 |
| WO | WO 98/40439 | 9/1998 |

\* cited by examiner

*Primary Examiner*—Kuo-Liang Peng
(74) *Attorney, Agent, or Firm*—Oblon, Spivak, McClelland, Maier & Neustadt, P.C.

(57) ABSTRACT

Provided is a curable silicone resin composition including (A) a siloxane/polycyclic hydrocarbon-based compound containing at least 2 silicon-bonded hydrogen atoms, which is an addition reaction product of (a) a siloxane-based compound with at least 3 silicon-bonded hydrogen atoms, and (b) a polycyclic hydrocarbon with at least 2 addition reactive carbon-carbon double bonds, (B) a siloxane-based compound containing at least 2 silicon-bonded alkenyl groups, and (C) a hydrosilylation reaction catalyst. This composition is useful as a material for optical devices or parts, insulation material for electronic devices or parts, or coating material.

15 Claims, No Drawings

CURABLE SILICONE RESIN COMPOSITION

BACKGROUND OF THE INVENTION

1. Field of the invention

The present invention relates to a curable silicone resin composition comprising a component with a polycyclic hydrocarbon skeleton, which is useful as a material for optical devices or parts, insulation material for electronic devices or parts, or coating material.

2. Description of the Prior Art

Conventionally, epoxy resins have normally been used as a material for optical devices or parts, in particular, sealing material for light emitting diode (LED) elements. In the case of silicone resins, tests have been conducted relating to their use as molded members for LED elements (see patent reference 1 and patent reference 2), or their use as color filter materials (see patent reference 3), although actual applications are few.

In recent years, with white LEDs attracting considerable attention, factors which until now have been considered unimportant, such as the yellowing of epoxy resin-based sealing materials caused by ultraviolet light or the like, and the appearance of cracks and the like caused by the increases in heating value accompanying miniaturization, now require urgent solutions. The use of cured products of silicone resins with a large quantity of phenyl groups within the molecules has been investigated as one potential solution to these problems. However, future LED light sources are likely to follow the trend towards the use of devices that generate light of shorter wavelengths, and because both epoxy resin-based sealing materials and phenyl group-containing silicone resin sealing materials display poor light transmittance in shorter wavelength regions, their application to such LEDs that generate light in the shorter wavelength regions has proven problematic.

Furthermore, optical material compositions comprising, as essential components, an organic compound with at least 2 carbon-carbon double bonds within each molecule, and a silicon compound with at least 2 hydrogen atoms bonded to silicon atoms within each molecule, have also been proposed (see patent reference 4 to patent reference 8). However, problems arise when these compositions undergo heat curing to generate a cured product, including foaming, curing shrinkage, and coloring of the cured product.

| | |
|---|---|
| [Patent Reference 1] | JP10-228249A |
| [Patent Reference 2] | JP10-242513A |
| [Patent Reference 3] | JP2000-123981A |
| [Patent Reference 4] | JP2002-324920A |
| [Patent Reference 5] | JP2002-327114A |
| [Patent Reference 6] | JP2002-327126A |
| [Patent Reference 7] | JP2002-338833A |
| [Patent Reference 8] | JP2002-341101A |

SUMMARY OF THE INVENTION

The present invention takes the above problems associated with the conventional technology into consideration, with an object of providing a curable silicone resin composition, which is useful as a material for optical devices or parts, insulation material for electronic devices or parts, or coating material, and yields a cured product that displays excellent hardness and strength, as well as excellent light transmittance in shorter wavelength regions.

As a result of intensive investigations aimed at achieving the above object, the inventors of the present invention were able to complete the present invention.

In other words, the present invention provides a curable silicone resin composition comprising:
(A) a siloxane/polycyclic hydrocarbon-based compound containing at least 2 hydrogen atoms bonded to silicon atoms within each molecule, which is an addition reaction product of (a) a siloxane-based compound with at least 3 hydrogen atoms bonded to silicon atoms within each molecule, and (b) a polycyclic hydrocarbon with at least 2 addition reactive carbon-carbon double bonds within each molecule,
(B) a siloxane-based compound containing at least 2 alkenyl groups bonded to silicon atoms within each molecule, and
(C) a hydrosilylation reaction catalyst.

A curable silicone resin composition of the present invention yields a cured product that displays excellent hardness and strength, superior light transmittance of light of shorter wavelength regions, and excellent transparency. Accordingly, the composition can be favorably used in applications such as the protection and sealing of light emitting diodes, or for other applications such as bonding, wavelength modification and adjustment, and lenses. Furthermore, the composition is also useful as a lens material, a sealing material for optical devices or optical parts, a variety of optical materials such as display materials, an insulating material for electronic devices or electronic parts, and a coating material.

DETAILED DESCRIPTION OF THE PREFERRED EMBODIMENTS

As follows is a more detailed description of the present invention.

[Component (A)]

The siloxane/polycyclic hydrocarbon-based compound of the component (A) of a composition of the present invention, which comprises at least 2 hydrogen atoms bonded to silicon atoms (hereafter, also described as "SiH" groups) within each molecule, is an addition reaction product of (a) a siloxane-based compound with at least 3 hydrogen atoms bonded to silicon atoms within each molecule, and (b) a polycyclic hydrocarbon with at least 2 addition reactive carbon-carbon double bonds within each molecule.

The polycyclic hydrocarbon (b) with at least 2 addition reactive carbon-carbon double bonds within each molecule, which represents one of the reaction raw materials for the component (A), may be any one of: (i) a hydrocarbon in which addition reactive carbon-carbon double bonds are formed between two adjacent carbon atoms that form the skeleton of the polycyclic hydrocarbon, (ii) a hydrocarbon in which hydrogen atoms bonded to carbon atoms that form the skeleton of the polycyclic hydrocarbon are substituted with groups containing addition reactive carbon-carbon double bonds, or (iii) a hydrocarbon in which an addition reactive carbon-carbon double bond is formed between two adjacent carbon atoms that form the skeleton of the polycyclic hydrocarbon, and a hydrogen atom bonded to a carbon atom that forms the skeleton of the polycyclic hydrocarbon is substituted with a group containing an addition reactive carbon-carbon double bond.

Preferred examples of the component (A) include those compounds represented by a general formula (1), a general formula (2) and a general formula (3) shown below.

$$H-X-(Y-X)p-Y' \quad (1)$$

(wherein, X is a bivalent residue of the siloxane-based compound (a) described above, Y is a bivalent residue of the polycyclic hydrocarbon (b) described above, Y' is a monovalent residue of the polycyclic hydrocarbon (b), H is a hydrogen atom, and p is an integer from 0 to 1000, and preferably from 0 to 100)

  (2)

(wherein, X, Y and H are as defined above, and n is an integer from 1 to 1000, and preferably from 1 to 100)

  (3)

(wherein, X, Y and Y' are as defined above, and q is an integer from 1 to 1000, and preferably from 1 to 100).

These compounds may be used singly or in combination of two or more.

Examples of the group X in the above formulas, that is, the bivalent residue of the siloxane-based compound (a), include the cyclic or chain-like bivalent groups represented by the general formulas shown below.

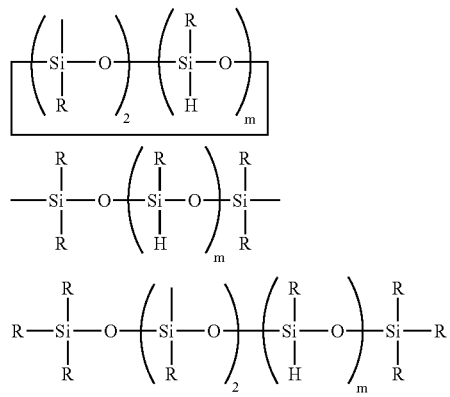

(wherein in each of the formulas, each R represents, independently, a monovalent hydrocarbon group or alkoxy group of 1 to 12 carbon atoms, and preferably 1 to 6 carbon atoms, and m is an integer of at least 1, and preferably at least 2, and most preferably 2)

Specific examples of the R groups include alkyl groups such as methyl groups, ethyl groups, propyl groups, isopropyl groups, butyl groups, tert-butyl groups and n-hexyl groups; aryl groups such as phenyl groups; and alkoxy groups such as methoxy groups, ethoxy groups and propoxy groups.

Specific examples of the aforementioned group X include: the cyclic siloxane residues shown below:

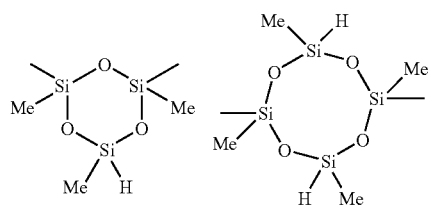

(wherein, "Me" represents a methyl group. This abbreviation also applies in following formulas), and the chain-like siloxane residues shown below.

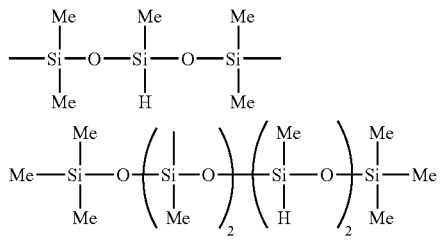

Examples of the group Y in the above formulas, that is, the bivalent residue of the polycyclic hydrocarbon (b), include the bivalent residues represented by the specific structural formulas shown below.

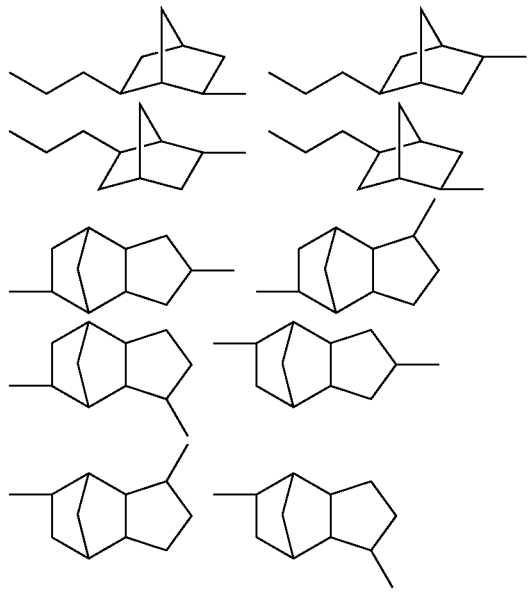

In the case of asymmetric bivalent residues represented by the above structural formulas, the left-right direction of the residue is not restricted to the orientation shown in the formula, and each of the structural formulas also includes the structure produced by a 180 degree rotation within the plane of the paper.

Examples of the group Y' in the above formulas, that is, the monovalent residue of the polycyclic hydrocarbon (b), include the monovalent residues represented by the specific structural formulas shown below.

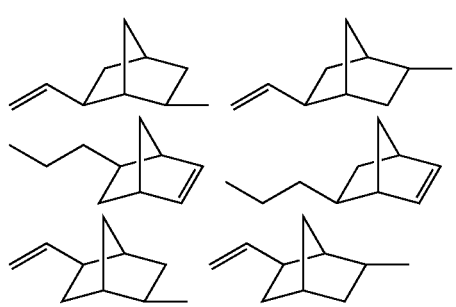

-continued

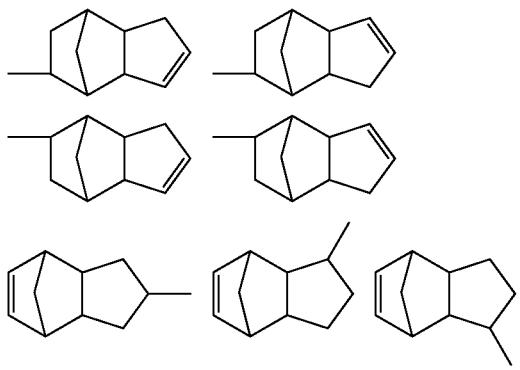

Specific examples of preferred forms of the above component (A) are presented below, although the component (A) is not restricted to the structures shown.

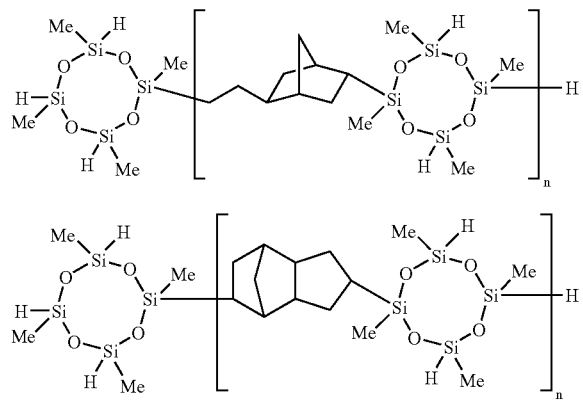

(wherein in each of the above formulas, n is as defined above in relation to the general formula (2))

The component (A), that is, the siloxane/polycyclic hydrocarbon-based compound containing at least 2 hydrogen atoms bonded to silicon atoms within each molecule, which is an addition reaction product of (a) a siloxane-based compound with at least 3 hydrogen atoms bonded to silicon atoms (SiH) within each molecule, and (b) a 10 polycyclic hydrocarbon with at least 2 addition reactive carbon-carbon double bonds within each molecule, can be produced, for example, by effecting an addition reaction between a cyclic 1,3,5,7-tetramethylcyclotetrasiloxane as the component (a), and 5-vinylbicyclo[2.2.1]hept-2-ene represented by a structural formula (x) shown below:

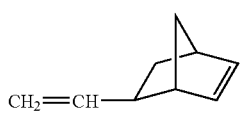 (x)

6-vinylbicyclo[2.2.1]hept-2-ene represented by a structural formula (y) shown below:

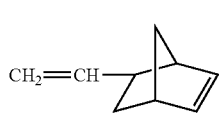 (y)

or a combination of these two structures (hereafter, these structures are not differentiated, but are rather referred to as "vinylnorbornene"), or dicyclopentadiene represented by a structural formula (z) shown below:

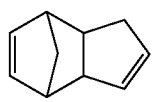 (z)

as the component (b), in the presence of a hydrosilylation catalyst such as platinum described below.

The position of substitution for the vinyl group in the above vinylnorbornenes may result in a cis arrangement, a trans arrangement, or a combination of both isomers.

During the addition reaction, by adjusting the quantities of the component (a) and the component (b) so that for every 1 mol of the component (b) such as the above vinylnorbornenes or dicyclopentadiene, the quantity of the component (a) such as 1,3,5,7-tetramethylcyclotetrasiloxane is within a range from 0.5 to 2 mols, and preferably from 1 to 1.5 mols, and even more preferably from 1.1 to 1.3 mols, a component (A) of the present invention, namely, a siloxane/polycyclic hydrocarbon-based compound containing at least 2 SiH groups within each molecule, can be prepared.

The component (A) may use either a single compound, or a combination of two or more compounds.

[Component (B)]

The component (B) of the present invention is a siloxane-based compound containing at least 2 alkenyl groups bonded to silicon atoms within each molecule, which undergoes an addition to the component (A) described above via a hydrosilylation reaction, thus generating a cured product.

Examples of the component (B) include cyclic siloxane-based compounds represented by a general formula (4) shown below, and chain-like siloxane-based compounds represented by a general formula (5), also shown below.

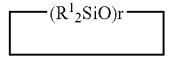 (4)

(wherein, each $R^1$ represents, independently, an unsubstituted or substituted monovalent hydrocarbon group of 1 to 12, and preferably from 1 to 6 carbon atoms, at least 2 of the plurality of $R^1$ groups are alkenyl groups, and r is an integer from 3 to 20, and preferably from 3 to 8)

$$R^2_3SiO-(R^1_2SiO)s-SiR^2_3 \quad (5)$$

(wherein, $R^1$ and $R^2$ each represent, independently, an unsubstituted or substituted monovalent hydrocarbon group of 1 to 12, and preferably from 1 to 6 carbon atoms, at least 2 of the plurality of $R^1$ and/or $R^2$ groups are alkenyl groups, and in those cases where none of the $R^1$ groups are alkenyl groups, s is either 0 or an integer from 1 to 100, and preferably from 1 to 20, whereas in those cases where either none of the $R^2$ groups, or only a single $R^2$ group, is an alkenyl group, s is an integer from 2 to 100, and preferably from 2 to 20)

Specific examples of the $R^1$ and $R^2$ groups include alkyl groups such as methyl groups, ethyl groups, propyl groups, isopropyl groups, butyl groups, tert-butyl groups, pentyl groups, hexyl groups, heptyl groups, octyl groups, nonyl groups, decyl groups and octadecyl groups; cycloalkyl groups such as cyclopentyl groups and cyclohexyl groups; aryl groups such as phenyl groups, tolyl groups, xylyl groups and naphthyl groups; aralkyl groups such as benzyl groups, phenethyl groups and 3-phenylpropyl groups; halogenated alkyl groups such as 3,3,3-trifluoropropyl groups and 3-chloropropyl groups; and alkenyl groups such as vinyl groups, allyl groups, butenyl groups, pentenyl groups and hexenyl groups.

Of these, in terms of industrial availability, vinyl groups are preferred as the alkenyl groups, and methyl groups are preferred as the non-alkenyl groups.

Specific examples of preferred forms of the component (B) are presented below, although the component (B) is not restricted to the structures shown. (In the formulas shown, "Vi" represents a vinyl group, and "Ph" represents a phenyl group. These abbreviations also apply in following formulas.)

(ViMeSiO)$_3$

(ViMeSiO)$_4$

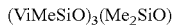
(ViMeSiO)$_3$(Me$_2$SiO)

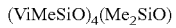
(ViMeSiO)$_4$(Me$_2$SiO)

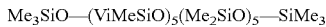
Me$_3$SiO—(ViMeSiO)$_5$(Me$_2$SiO)$_5$—SiMe$_3$

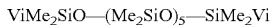
ViMe$_2$SiO—(Me$_2$SiO)$_5$—SiMe$_2$Vi

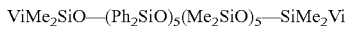
ViMe$_2$SiO—(Ph$_2$SiO)$_5$(Me$_2$SiO)$_5$—SiMe$_2$Vi

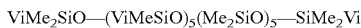
ViMe$_2$SiO—(ViMeSiO)$_5$(Me$_2$SiO)$_5$—SiMe$_2$Vi

The component (B) of the present invention may use either a single compound, or a combination of two or more compounds.

The quantity added of the component (B) is adjusted so that relative to each 1 mol of SiH groups within the component (A), the number of mols of alkenyl groups such as vinyl groups within the component (B) typically falls within a range from 0.5 to 2.0 mols, and preferably from 0.8 to 1.5 mols. By ensuring a quantity within this range, a cured product that displays sufficient hardness for applications such as coating materials can be obtained.

[Component (C)]

The hydrosilylation catalyst of the component (C) of the present invention can use any of the conventionally available products. Suitable examples include platinum-based catalysts such as platinum black, platinum (IV) chloride, chloroplatinic acid, reaction products of chloroplatinic acid and monovalent alcohols, complexes of chloroplatinic acid and olefins, and platinum bisacetoacetate; as well as other platinum group metal catalysts such as palladium-based catalysts and rhodium-based catalysts.

There are no particular restrictions on the quantity used of the component (C), and any effective catalytic quantity is adequate, although a typical quantity, calculated as the weight of platinum group metal atoms relative to the combined weight of the component (A) and the component (B), is from 1 to 500 ppm, and preferably from 2 to 100 ppm. By ensuring a quantity within this range, the time required for the curing reaction is suitably short, and problems such as coloring of the cured product do not arise.

[Other Components]

In addition to the components (A) through (C) described above, antioxidants may also be added to the composition of the present invention if required.

Any of the conventionally available antioxidants can be used, and suitable examples include 2,6-di-t-butyl-4-methylphenol, 2,5-di-t-amylhydroquinone, 2,5-di-t-butylhydroquinone, 4,4'-butylidene-bis(3-methyl-6-t-butylphenol), 2,2'-methylene-bis(4-methyl-6-t-butylphenol), and 2,2'-methylene-bis(4-ethyl-6-t-butylphenol). These compounds can be used singularly, or in combinations of two or more different compounds.

In those cases where an antioxidant is added, there are no particular restrictions on the quantity added, and any quantity that provides effective antioxidant action is adequate, although a typical quantity, calculated relative to the combined weight of the component (A) and the component (B), is from 10 to 10,000 ppm, and preferably from 100 to 1,000 ppm. By ensuring a quantity within this range, the antioxidant action can be manifested satisfactorily, and a cured product with superior optical characteristics, with no coloring, turbidity or oxidation deterioration, can be obtained.

Furthermore, in addition to the components (A) through (C), components other than the antioxidants described above may also be added to the composition of the present invention, provided such addition does not impair the effects of the present invention.

Examples of such components include straight chain diorganopolysiloxanes or network-type organopolysiloxanes containing either alkenyl groups bonded to silicon atoms or SiH groups, as well as unreactive straight chain or cyclic diorganopolysiloxanes and silphenylene-based compounds, which can be added to regulate factors such as the viscosity of the composition or the hardness of the cured product.

In the present invention, if an organopolysiloxane with any of a variety of structures containing SiH groups is added to the composition in addition to the component (A), then the quantity of this other organopolysiloxane must be set so that relative to 1 mol of the combined total of the SiH groups within this other organopolysiloxane and the SiH groups within the component (A), the quantity of alkenyl groups within the component (B) typically falls within a range from 0.5 to 2.0 mols, and preferably from 0.8 to 1.5 mols.

Furthermore, if an organopolysiloxane with any of a variety of structures containing alkenyl groups bonded to silicon atoms is added to the composition in addition to the component (B), then the quantity of this other organopolysiloxane must be set so that relative to each 1 mol of SiH groups within the component (A), the combined quantity of the alkenyl groups within this other organopolysiloxane and the alkenyl groups within the component (B) typically falls within a range from 0.5 to 2.0 mols, and preferably from 0.8 to 1.5 mols.

Furthermore, in order to extend the pot life, addition reaction control agents such as 1-ethynylcyclohexanol and 3,5-dimethyl-1-hexyn-3-ol may also be added. In addition, inorganic fillers such as fumed silica may also be added to improve the strength, provided such addition does not impair the transparency of the cured product produced from the composition, and where necessary, dyes, pigments and flame retardants and the like may also be added.

In addition, light stabilizers can also be used for imparting resistance to light deterioration caused by light energy from sunlight or fluorescent lights or the like. Hindered amine-based stabilizers, which capture the radicals generated when a cured product from a composition of the present invention oxidizes and deteriorates on light exposure, are ideal as these light stabilizers, and by using such light stabilizers in combination with the antioxidants described above, the oxidation prevention effect can be further improved. Specific examples of these light stabilizers include bis(2,2,6,6-tetramethyl-4-piperidyl) sebacate and 4-benzoyl-2,2,6,6-tetramethylpiperidine.

There are no particular restrictions on the curing conditions for a composition of the present invention, which will vary depending on the quantity of the composition, although normally, curing at 60 to 180° C. for a period of 5 to 180 minutes is preferred.

EXAMPLES

As follows is a more specific description of the present invention, using a series of examples and comparative examples, although the present invention is in no way restricted to the examples presented below.

Synthetic Example

Preparation of Component (A)

In a 500 mL 4-neck flask equipped with a stirring device, a cooling tube, a dropping funnel and a thermometer were placed 80 g of toluene and 115.2 g (0.48 mols) of 1,3,5,7-tetramethylcyclotetrasiloxane, and the solution was then heated to 117° C. using an oil bath. 0.05 g of carbon powder supporting 5% by weight of platinum metal was added, and with the mixture undergoing constant stirring, 48 g (0.4 mols) of a vinylnorbornene (brand name: V0062, manufactured by Tokyo Kasei Kogyo Co., Ltd., an approximately equimolar isomeric mixture of 5-vinylbicyclo[2.2.1]hept-2-ene and 6-vinylbicyclo[2.2.1]hept-2-ene) was added dropwise over a period of 16 minutes. Following completion of the dropwise addition, the reaction mixture was heated and stirred at 125° C. for 16 hours, and was then cooled to room temperature. Subsequently, the carbon supported platinum metal was removed by filtration, and the toluene was removed under reduced pressure, yielding a colorless, transparent, oily product (viscosity at 25° C.: 2,500 mm²/s).

On the basis of the results of FT-IR, NMR and GPC analyses of this reaction product, it was confirmed as being a mixture of:

(1) compounds containing 1 tetramethylcyclotetrasiloxane ring: approximately 6 mol % (one example of a representative structural formula is shown below),

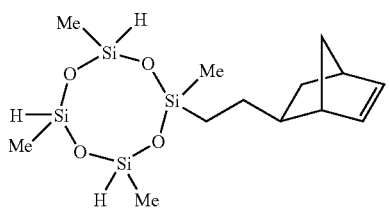

(2) compounds containing 2 tetramethylcyclotetrasiloxane rings: approximately 25 mol % (one example of a representative structural formula is shown below),

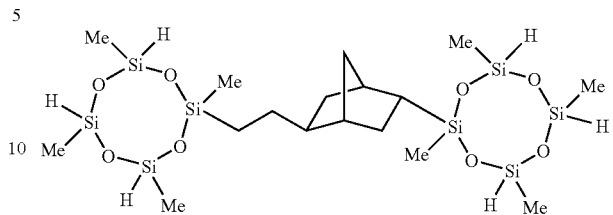

(3) compounds containing 3 tetramethylcyclotetrasiloxane rings: approximately 16 mol % (one example of a representative structural formula is shown below),

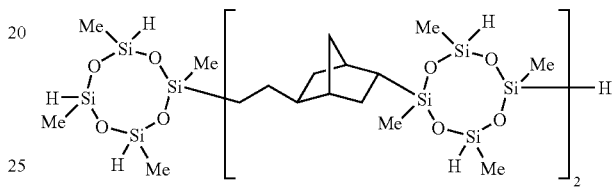

(4) compounds containing 4 tetramethylcyclotetrasiloxane rings: approximately 11 mol % (one example of a representative structural formula is shown below),

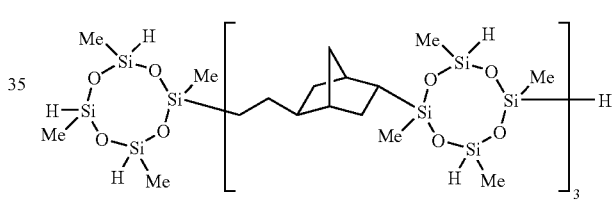

and (5) compounds containing from 5 to 12 cyclotetrasiloxane rings: the remainder (one example of a representative structural formula is shown below),

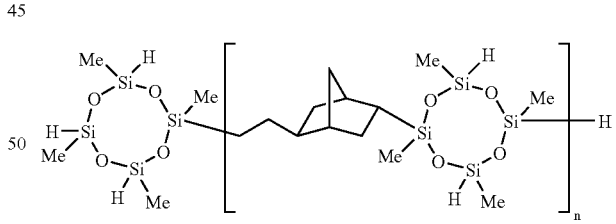

(wherein, n is an integer from 4 to 20).

The quantity of SiH groups within the reaction product was an average of 5.7 millimols/g.

Example 1

(A) The reaction product produced in the synthetic example: 68 parts by weight,
(B1) (ViMeSiO)$_4$: 32 parts by weight (the molar ratio [vinyl groups within the component (B1)]/[SiH groups within the component (A)]=1.0, as above, this molar ratio of vinyl groups/SiH groups is abbreviated as "Vi/SiH"), (C) platinum-vinylsiloxane complex: 20 ppm of platinum metal atoms relative to the combined weight of (A) and (B1), and
1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a molded product.

Example 2

(A) The reaction product produced in the synthetic example: 51 parts by weight,
(B2) (ViMeSiO)$_4$: 39 parts by weight, and (HMeSiO)$_4$: 10 parts by weight (Vi/SiH=1.0),
(C) platinum-vinylsiloxane complex: 20 ppm of platinum metal atoms relative to the combined weight of (A) and (B2), and 1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a molded product.

Example 3

(A) The reaction product produced in the synthetic example: 68 parts by weight,
(B3) ViMe$_2$SiO(Me$_2$SiO)$_5$SiMe$_2$Vi: 32 parts by weight (Vi/SiH=1.0),
(C) platinum-vinylsiloxane complex: 20 ppm of platinum metal atoms relative to the combined weight of (A) and (B3), and 1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a molded product.

Comparative Example 1

With the exceptions of replacing the component (A) of the example 1 with 59 parts by weight of (MeHSiO)$_4$, and altering the quantity of the (ViMeSiO)$_4$ of the component (B1) to 41 parts by weight (Vi/SiH=1.0), a composition and a cured product were prepared in the same manner as the example 1.

Comparative Example 2

A phenylsilicone resin-based curable composition (brand name: X-34-1195, manufactured by Shin-Etsu Chemical Co., Ltd., phenyl group content: approximately 50 mol %) was poured into a mold formed from glass plates in a similar manner to the example 1 to generate a thickness of 4 mm, and was then heated at 150° C. for 8 hours, thus yielding a molded product.

<Performance Evaluation Methods>
(1) The performance of the cured products prepared in each of the examples and comparative examples described above was evaluated using the following techniques.
External Appearance
The external appearance of each cured product was inspected visually. The results are shown in Table 1.
Hardness
The hardness (Shore D) of each cured product was measured in accordance with ASTM D 2240. The results of the measurements are shown in Table 1.
Elastic Modulus
A test specimen of dimensions 10 mm×100 mm was prepared from each 4 mm thick cured product, and the elastic modulus (MPa) of the test specimen was measured in accordance with JIS K-6911, using a 3 point bending test. The results of the measurements are shown in Table 1.
(2) Light Transmittance
The light transmittance of each cured product was measured with a spectrophotometer, at four measurement wavelengths: 800, 600, 400 and 300 nm (ultraviolet light region). The results of the measurements are shown in Table 2.

TABLE 1

| Item | Examples | | | Comparative examples | |
|---|---|---|---|---|---|
| | 1 | 2 | 3 | 1 | 2 |
| External appearance | colorless, transparent | colorless, transparent | colorless, transparent | colorless, transparent | colorless, transparent |
| Hardness (Shore D) | 54 | 53 | 50 | 0 | 64 |
| Elastic modulus (MPa) | 990 | 900 | 880 | 350 | 1520 |

(Note: The cured product obtained in the comparative example 1 was a flexible product with a hardness (Shore D) of 0.)

TABLE 2

| wavelength (nm) | Examples | | | Comparative examples | |
|---|---|---|---|---|---|
| | 1 | 2 | 3 | 1 | 2 |
| 800 | 90% | 90% | 90% | 94% | 95% |
| 600 | 90% | 90% | 90% | 94% | 95% |
| 400 | 88% | 87% | 87% | 94% | 92% |
| 300 | 61% | 59% | 59% | 30% | 0% |

[Evaluations]

It is evident that in comparison with the products of the comparative examples, the cured products of the examples not only displayed hardness and elastic modulus values that represented levels of hardness and strength suitable for practical purposes in each case, but also provided excellent light transmittance at the short wavelength of 300 nm (ultraviolet light region).

What is claimed is:
1. A curable silicone resin composition, comprising:
(A) a siloxane/polycyclic hydrocarbon-based compound containing at least 2 hydrogen atoms bonded to silicon atoms within each molecule, which is an addition reaction product of (a) a siloxane-based compound having at least 3 hydrogen atoms bonded to silicon atoms within each molecule, and (b) a polycyclic hydrocarbon having at least 2 addition reactive carbon-carbon double bonds within each molecule,

(B) a siloxane-based compound containing at least 2 alkenyl groups bonded to silicon atoms within each molecule, and (C) a hydrosilylation reaction catalyst, wherein said siloxane/polycyclic hydrocarbon-based compound of the component (A) comprises at least one compound of the compounds represented by formula (1), formula (2) or formula (3) as follows:

  (1)

wherein, X is a bivalent residue of said siloxane-based compound (a),

Y is a bivalent residue of said polycyclic hydrocarbon (b), said Y moiety having one of the following structures:

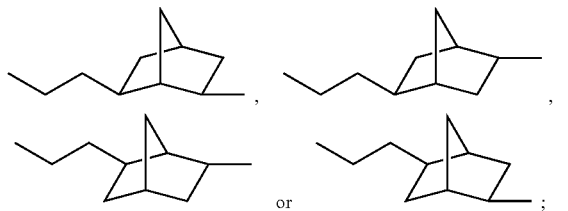

Y' is a monovalent residue of said polycyclic hydrocarbon (b), said Y' moiety having one of the following structures:

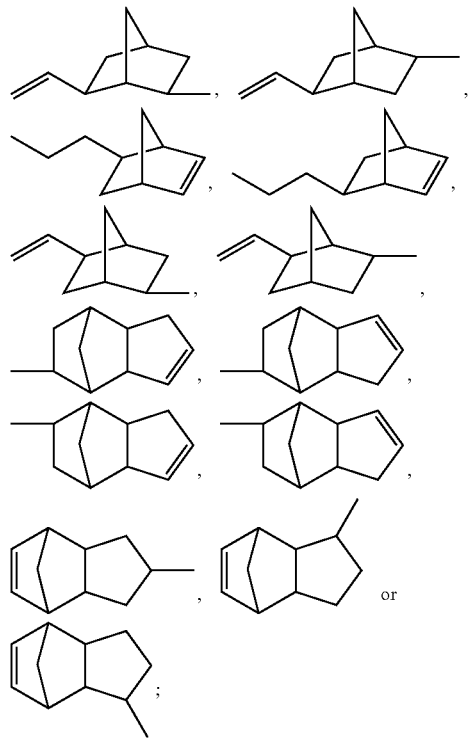

H is hydrogen and p is an integer ranging from 0 to 1000;

  (2)

wherein, X, Y and H are as defined above, and n is an integer ranging from 1 to 1000; and

  (3)

wherein, X, Y and Y' are as defined above, and q is an integer ranging from 1 to 1000;

wherein upon curing the cured silicone resin is colorless and transparent.

2. The composition according to claim 1, wherein the quantity of alkenyl groups within said component (B), relative to each 1 mol of hydrogen atoms bonded to silicon atoms within said component (A), is within a range from 0.5 to 2.0 mols.

3. The composition according to claim 1, wherein the group X is represented by the formula:

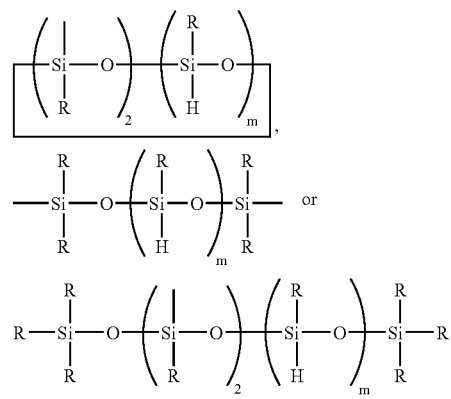

wherein in each of the formulas, each R represents, independently, a monovalent hydrocarbon group or alkoxy group of 1 to 12 carbon atoms, and m is an integer of at least 1.

4. The composition according to claim 1, wherein the group X is represented by the formula:

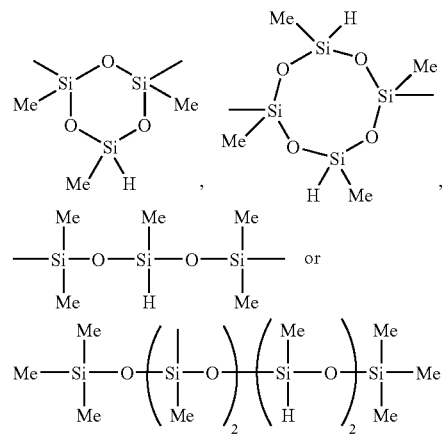

wherein, in the formulas, Me represents a methyl group.

5. The composition according to claim 1, wherein said component (A) is an addition reaction product of 5-vinyl-bicyclo[2.2.1]hept-2-ene, 6-vinylbicyclo[2.2.1]hept-2-ene, or a combination thereof, with 1,3,5,7-tetramethylcyclotetrasiloxane.

6. The composition according to claim 1, wherein said component (B) is a cyclic siloxane with at least 2 vinyl groups bonded to silicon atoms within each molecule.

7. The composition according to claim 1, wherein said Y' moiety is represented by the formula:

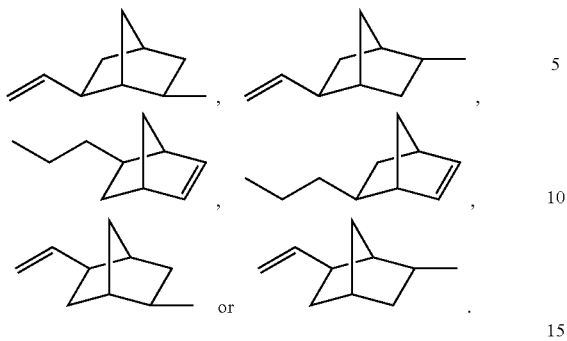

8. The composition according to claim 1, wherein said siloxane/polycyclic hydrocarbon-based compound (A) is a compound of the formula:

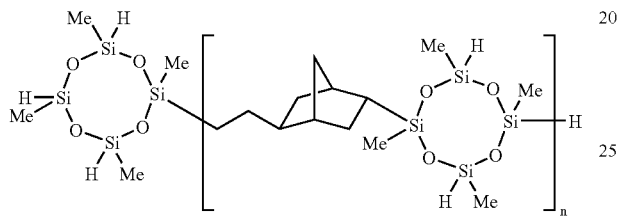

wherein Me is a methyl group, and n is an integer of 1 to 1,000.

9. A cured product obtained by curing a composition according to claim 1.

10. A curable silicone resin composition, comprising:

(A) a siloxane/polycyclic hydrocarbon-based compound containing at least 2 hydrogen atoms bonded to silicon atoms within each molecule, which is an addition reaction product of (a) a siloxane-based compound having at least 3 hydrogen atoms bonded to silicon atoms within each molecule, and (b) a polycyclic hydrocarbon having at least 2 addition reactive carbon-carbon double bonds within each molecule, (B) a siloxane-based compound containing at least 2 alkenyl groups bonded to silicon atoms within each molecule, and (C) a hydrosilylation reaction catalyst, wherein said siloxane/polycyclic hydrocarbon-based compound of the component (A) comprises at least one compound of the compounds represented by formula (1), formula (2) or formula (3) as follows:

H—X—(Y—X)p-Y'  (1)

wherein, X is a bivalent residue of said siloxane-based compound (a),

Y is a bivalent residue of said polycyclic hydrocarbon (b), said Y moiety having one of the following structures:

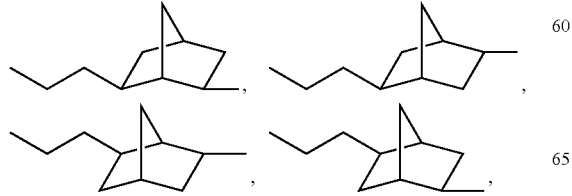
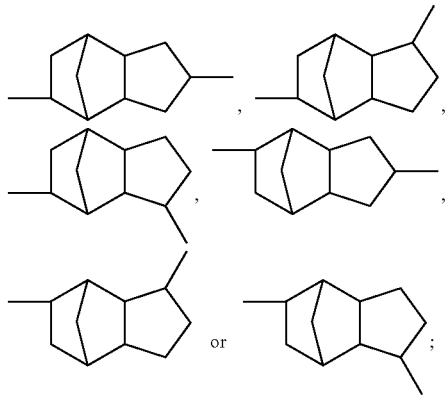

Y' is a monovalent residue of said polycyclic hydrocarbon (b), said Y' moiety having one of the following structures:

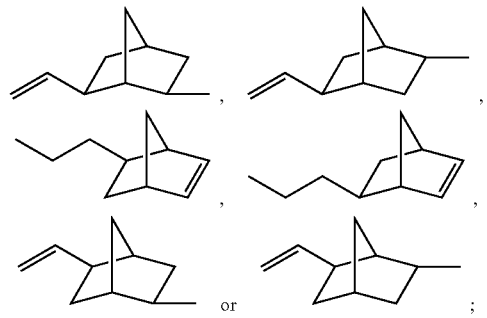

H is hydrogen and p is an integer ranging from 0 to 1000; and

Y'—X—(Y—X)q-Y'  (3)

wherein, X, Y and Y' are as defined above, and q is an integer ranging from 1 to 1000;

wherein upon curing the cured silicone resin is colorless and transparent.

11. The composition according to claim 10, wherein the quantity of alkenyl groups within said component (B), relative to each 1 mol of hydrogen atoms bonded to silicon atoms within said component (A), is within a range from 0.5 to 2.0 mols.

12. The composition according to claim 10, wherein the group X is represented by the formula:

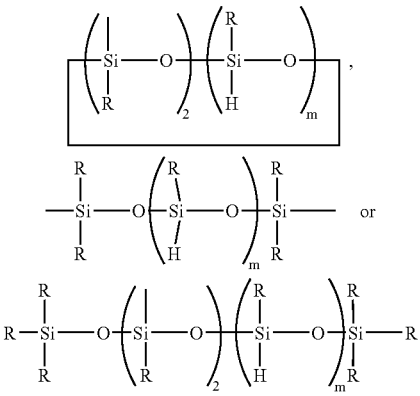

wherein in each of the formulas, each R represents, independently, a monovalent hydrocarbon group or alkoxy group of 1 to 12 carbon atoms, and m is an integer of at least 1.

13. The composition according to claim 10, wherein the group X is represented by the formula:

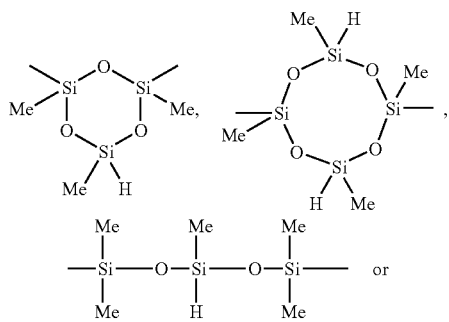

wherein, in the formulas, Me represents a methyl group.

14. The composition according to claim 10, wherein said component (B) is a cyclic siloxane with at least 2 vinyl groups bonded to silicon atoms within each molecule.

15. A cured product obtained by curing a composition according to claim 10.

* * * * *